United States Patent Office 3,047,926
Patented Aug. 7, 1962

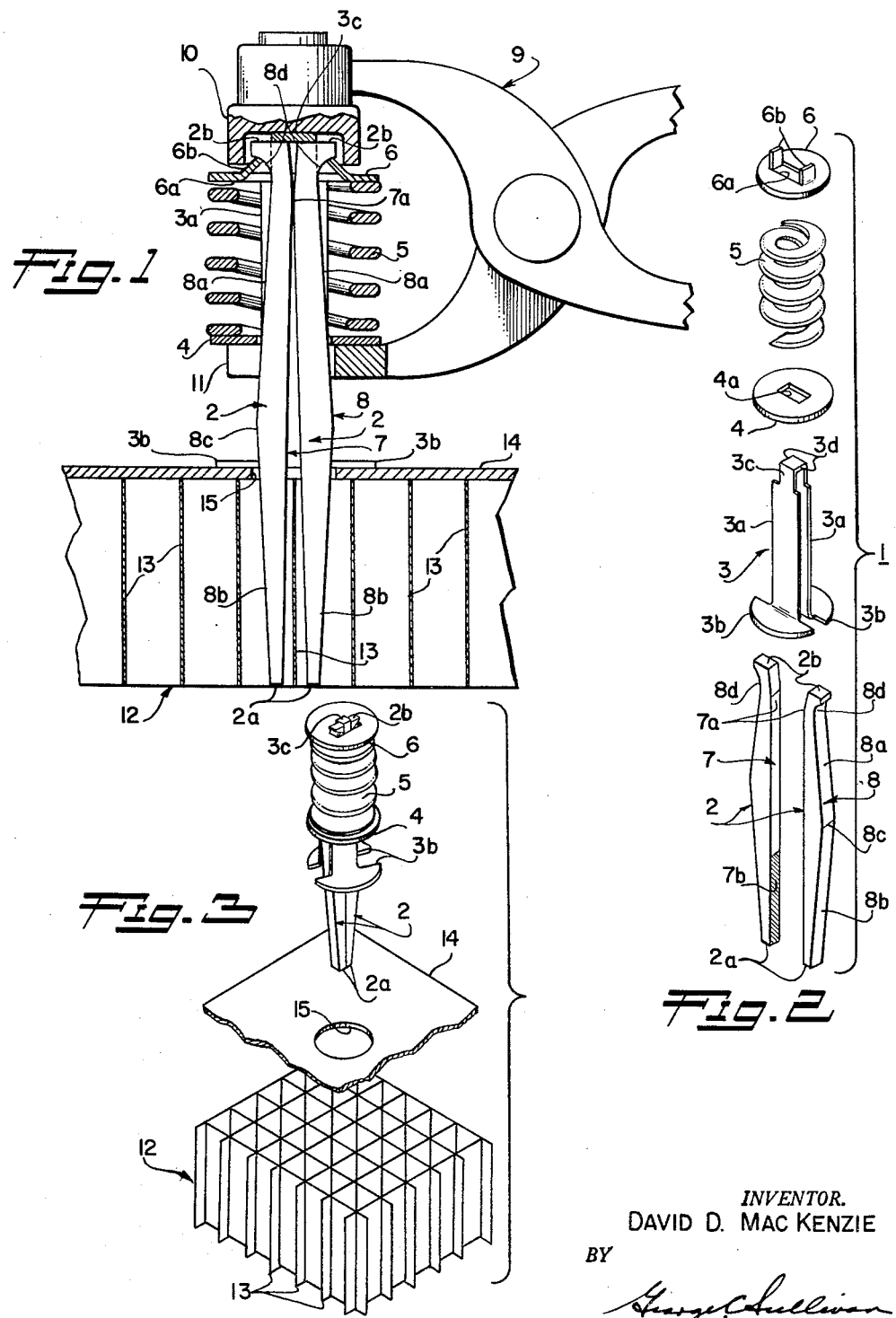

3,047,926
HONEYCOMB FASTENER
David D. MacKenzie, Atlanta, Ga., assignor to Lockheed Aircraft Corporation, Los Angeles, Calif.
Filed Aug. 19, 1960, Ser. No. 50,711
5 Claims. (Cl. 24—251)

This invention relates to a work piece attachment holder, and more particularly a clamp type fastener for use in attaching honeycomb core to a handling fixture or tool, or which may be fastened to honeycomb blanket core to serve as a handle or gripping means therefor.

Handling of metallic honeycomb cores during manufacture of the blankets, as well as assembly of the core with face sheets to form honeycomb panels, is both crucial and difficult. The rigidity and high strength to weight ratios of honeycomb panels are not realized until an assembly of core and face sheet is obtained, for prior to such assembly the blanket honeycomb cores are quite flexible and delicate because of the thin cell walls, which may be as little as 0.001 inch thick.

Protection for the core material is afforded by use of holding or handling fixtures during fabrication, machining, processing or assembly. Prior known devices for holding the core material to the fixtures include expensive and complicated equipment such as multiple finger devices, suction devices with back up plates, multiple grappling hooks, inflatable manipulators, etc.

Without some type of handling device including a handle, or capable of serving as such, there is an increased danger of personal injury to workmen handling the core material because of sharp corners, or jagged, knife-like edges that are present when cutting or splicing the core material.

Accordingly, it is an object of this invention to provide a simple and inexpensive means to handle honeycomb blanket core throughout various fabrication and assembly operations.

Another object of this invention is to provide a means that is easily and quickly mountable or securable to honeycomb core without damage to the core.

It is still a further object of this invention to provide a means that can serve to mount honeycomb core to a holding fixture as well as be capable of serving as a handle when mounted to the honeycomb core without fixtures.

Other objects and advantages will become apparent in the following description taken in connection with the accompanying drawings in which:

FIGURE 1 is a partial cross-sectional view of one embodiment of this invention in a substantially installed position except for the fastener jaws being in a released position;

FIGURE 2 is an exploded perspective of the invention embodiment depicted in FIGURE 1, showing the relative locations of all parts of a fastener when assembled; and FIGURE 3 is an exploded perspective of the invention embodiment installation depicted in FIGURE 1, showing the relative locations of all parts of the assembly.

Generally stated, one embodiment of the invention comprises a pair of clamping jaws biased together by a spring maintained between a pair of washers serving to retain all parts of the fastener in proper assembly and transmit the spring forces to the jaws. The jaws are specially shaped so as to permit a coaction therebetween of separation of the clamping portion of the jaws when the spring is compressed.

Referring more particularly to the figures, the fastener assembly 1 comprises a pair of jaws 2, a pad member 3, a washer 4, a spring 5, and a retainer member 6.

The jaws 2 are of a substantially constant thickness and have an edge 7 which is substantially straight from tip 2a to a region indicated as 7a whereupon the edge becomes slightly rounded or arcuate, the purpose of which will be explained in more detail hereinafter. The end of jaws 2 adjacent the rounded or arcuate section 7a is widened to form a pedestal 2b. If desired, a rough grind finish 7b may be put on a portion of edge 7 adjacent tip 2a.

The opposite edge 8 of jaws 2 is formed by two surfaces 8a and 8b which are at an angle relative to each other to form a peak 8c intermediate the ends of 2a and 2b of jaws 2. The edge portion 8a is blended into pedestal 2b by a curved section 8d, the purpose of which will also be explained in more detail hereinafter.

Pad member 3 comprises a U-shaped sheet metal stamping having legs 3a, each having a pad foot 3b extending at right angles at the free end thereof. Cutouts 3d result in the portion 3c of the pad member 3 being of lesser width than legs 3a.

Washer 4 has a rectangular opening 4a therein, the width of opening 4a being slightly larger than the thickness of jaws 2, the length of opening 4a being sufficiently large to permit travel of washer 4 longitudinally along jaw members 2 between curved edge portion 8d and peak 8c when they are inserted through the opening 4a with surfaces 7 in abutment. Likewise, the length of opening 4a will be less than the combined overall width of peaks 8c of jaws 2 when their surfaces 7 are in abutting relation.

As can be seen and understood by the details of assembly and operation hereinafter, the width of legs 3a of pad member 3 will be slightly less than the length of opening 4a.

Spring 5 is a compression type spring and preferably flat ground at both ends; it being understood that the flat grind of the spring ends is stated as being preferable only, and does not form any limitations to this invention.

Retainer 6 has an opening 6a therein with ears or lugs 6b extending perpendicularly therefrom at the time of forming retainer 6 as can best be seen in FIGURE 2.

Assembly of the parts is accomplished by inserting jaws 2 with edges 7 in abutment into the space between legs 3a of pad member 3 so that surface portions of the pedestals 2b will seat on the inner surface of portion 3c. Washer 4 is then mounted over the jaws 2 and pad member 3 by slipping the pedestal members through opening 4a one at a time. The taper of portions 8a of jaws 2 will permit washer 4 to move longitudinally along the portions 8a of jaws 2 until the width of the pair of jaws 2 is equal to the length of opening 4a. As pointed out above, washer 4 will come at a rest some place along edge portions 8a between edge portions 8d and 8c. Spring 5 is then placed around the upper portions of jaws 2 and pad member 3 until the bottom of spring 5 rests on washer 4. Retainer 6 is then placed on top of spring 5 with the pedestals 2b of jaws 2 and portion 3c of pad member 3 extending through opening 6a. Compression of spring 5 by movement of retainer 6 toward washer 4 clears the ears or tabs 6b to be bent inwardly to seat upon portions 8d of edge 8 as can best be seen in FIGURE 1. Release of the assembly then will place the ends of tabs 6b in contact with surface portion 8d of jaws 2 and the width sides of opening 4a in washer 4 will be forced into contact with both edge portions 8a causing the edge portions 7b of jaws 2 into contact.

Opening or closing of jaws 2 is accomplished by use of a special tool 9 as shown in FIGURE 1, which is similar to a pair of pliers and comprises a recessed collar type jaw member 10 which sits on the upper surface of portion 3c of pad member 3. The other jaw 11 consists of a bifurcated or semicircular yoke member engageable with the bottom of washer 4. By operating the tool 9 to move jaws 10 and 11 toward each other, washer 4 is moved upward relative to fastener jaws 2 and the compressive force of spring 5 by such movement of washer 4 is in turn transmitted to retainer 6 and tabs 6b. Pressure or force from tabs 6b reacts on curved edge portions 8d of jaws 2 to swing them about the curved edge portions 7a so that the confronting edge portions of the pedestals 2b approach each other resulting in the tip portion 2a of jaws 2 opening by separation as can be seen in FIGURE 1. Closure of the jaws 2 is accomplished by release of the tool and the compression force of spring 5 being in turn transmitted to washer 4 which is now free to move downwardly relative to jaws 2, the width edges of opening 4a in washer 4 coming into contact with portions 8a of edges 8 forcing the jaw tips 2a together.

Referring to FIGURES 1 and 3 more particularly, a honeycomb blanket core 12 is shown which is formed by a plurality of cells of extremely thin walls 13; the method of manufacture or type of cell structure being of any appropriate kind and does not form a part of this invention. The honeycomb blanket or core may be mounted to a work holder or holding fixture 14 having an opening 15 contained therein by placing the honeycomb blanket core assembly 12 into contact with one side of the fixture 14 and passing the tips 2a of the jaws 2, when separated, through the opening 15 into a straddle position over one of the walls 13 as shown in FIGURE 1. Upon release of the tool 9 the jaws 2 will be clamped together by the action of spring 5 thereby clamping onto the opposite sides of cell wall 13. The rough grind edge portion 7b of edge 7 is provided to increase the coefficient of friction between the jaw edges and the cell wall. The extent of penetration of jaws 2 through opening 15 is limited by the bottoms of the pad seat 3b coming into contact with the outer surface of fixture 14, it of course being realized that any lesser amount of penetration may be effected, the only result being a lesser amount of surface contact between jaws 2 and cell wall 13.

It can also be seen that mounting of fastener assembly 1 on a honeycomb blanket core 12 without inclusion of holding fixture 14 will permit the fastener assembly 1 to serve as a handle for handling purposes by workmen without the necessity of having to come into physical contact with the core blanket 12.

While cell walls 13 may be so thin as to be termed delicate, the clamping action of jaws 2 on each side thereof results in a firm clamping grip on the cell wall without damage thereto.

Thus it can be seen there is provided a simple and inexpensive fastener means for mounting to a cell wall of honeycomb blanket core wherein the fastener assembly may be utilized as a handle, or, wherein the core may be mounted to a work or holding fixture.

While one particular embodiment of the invention has been illustrated and described, it will be obvious to those skilled in the art that various changes and modifications may be made without departing from the invention and it is intended to cover in the appended claims all such modifications and equivalents that fall within the true spirit and scope of this invention.

What is claimed is:

1. A clamp type fastener assembly comprising, a pair of elongate jaw members each having two parallel sides for substantially constant thickness and a first and second elongate edge, a strap means shaped to provide containment of both said jaw members along a portion of said opposite parallel sides and one end thereof, said containment of the jaw members having their said first elongate edges in abutting confrontation, a first and second washer means encircling said strap means and the jaw members, a spring encircling the strap means and the jaw members and located between said first and second washer means to bias the first and second washer means away from each other, said second elongate edge having an indentation adjacent the end contained by the strap means and thereafter tapering divergingly relative to said first elongate edge toward the other end to a point where the combined width of both jaw members is greater than the opening in said first washer means, and a pair of retaining tabs extending from the surface of the opening in the second washer means which are deflected to seat in the second elongate edge indentations when the fastener is assembled, said assembly coacting to open the uncontained ends of the jaw members by moving the first washer means toward the second washer means and move the uncontained ends of the jaw members into clamping closure upon release of the first washer for movement away from the second washer means by the spring to the position where the combined distance between said second elongate edges is equal to the opening size of the first washer.

2. A clamp type fastener assembly as claimed in claim 1 wherein the opening in said first washer is rectangular having a width sufficient to pass over the combined thickness of the jaw members and strap means on both sides thereof, and a length that is greater than the combined width of the jaw members at the indentations in the second elongate edge.

3. A clamp type fastener assembly comprising, a pair of elongate jaw members of substantially constant thickness and each having a first and second elongate edge, said first elongate edges having a substantial straight portion and an arcuate portion proximate one end whereby when said jaw members are positioned with said first edges in abutment and either jaw member is pivoted about the arcuate portion relative to the other one pair of adjacent ends will move towards each other and the other pair of adjacent ends will separate, said second elongate edges having a concave arcuate portion proximate the same end as the first edge arcuate portion, the second elongate edge proceeding from the concave arcuate portion toward the other jaw member ends in a divergingly taper relative to the first edge for approximately one half the length of said jaw members, a strap means shaped to provide containment of both said jaws along a portion of the jaw member sides and the ends proximate said arcuate portions, said containment of the jaw members having their first elongate edges in abutting confrontation, a first washer means mounted around the strap means and jaw members, a compression coil spring mounted longitudinally around the strap means and jaw members with one end abutting said first washer, a second washer means mounted around the strap means and jaw members and having a pair of retaining tabs extending from the surface of the opening therein, said tabs deflected to seat on the concave arcuate portions of the second elongate edges when the fastener is assembled thereby retaining the first and second washer means and spring in mounted position around said strap means and jaw members, said assembly coacting to open the other jaw member ends by pivoting said jaw members about the first edge arcuate portions proximate the contained ends of the jaw members, the pivoting forces supplied by moving the first washer means longitudinally along the strap means and jaw members towards the second washer means whereby the spring is compressed and its forces are transmitted to the concave arcuate portions of the second elongate edges through the second washer means and tabs, the clamping closure of the open jaw members occurring upon release of the first washer means whereby said first washer means is forced longitudinally along the strap means and jaw members towards the open ends to a point where the distance between the second elongate edges equals the opening size in the first washer means.

4. A clamp type fastener assembly comprising, a pair of elongate jaw members having a first and second elongate edge, camlike arcuate portions on each of said first edges proximate one end thereof to permit a relative rocking motion between the jaw members when said first edges are in abutment and a force is applied at a point longitudinally removed from said arcuate portions, an indentation on said second elongate edge in closer proximity to said one end of the jaw members than said first edge arcuate portion, a portion of said second elongate edge from said indentation divergingly tapering relative to the first edge toward the other end of the jaw members for increasing the widths of the intermediate portions of the jaw members, a U-shaped strap means contacting said one end of the jaw members and extending along the opposite sides thereof for less than the entire length of the jaw members, a first and second washer means encircling said strap means and jaw members, said second washer means including tabs extending from the internal surface, and a coil compression spring encircling said strap means and jaw members and located between said first and second washer means, said second washer means retained in position by deflection of said tabs into the indentation in the second elongate edge while the first washer means is limited in longitudinal travel along the strap means and jaw members to the point where the distance between said second edge is equal to the first washer opening, said assembly coacting to open the other jaw member ends by pivoting said jaw members about the arcuate portions of the first edge proximate the contained ends of the jaw members, the pivoting forces supplied by moving the first washer means longitudinally along the strap means and jaw members towards the second washer means whereby the spring is compressed and its forces are transmitted through the second washer means and tabs to the concave arcuate portions of the second elongate edges, the clamping closure of the open jaw members occurring upon release of the first washer means whereby said first washer means is forced longitudinally along the strap means and jaw members towards the open ends to a point where the distance between the second elongate edges equals the opening size in the first washer means.

5. A clamp type fastener assembly as claimed in claim 1 wherein said strap means includes a pad means at the ends thereof for limiting the maximum gripping length of the jaw members.

References Cited in the file of this patent
UNITED STATES PATENTS

| | | |
|---|---|---|
| 961,203 | Batchelor | June 14, 1910 |
| 2,478,034 | Zademach et al. | Aug. 2, 1949 |
| 2,549,589 | Flynn | Apr. 17, 1951 |

FOREIGN PATENTS

| | | |
|---|---|---|
| 357,115 | France | Oct. 28, 1905 |
| 58,643 | Switzerland | Nov. 8, 1911 |
| 441,668 | Germany | Mar. 8, 1927 |